Sept. 28, 1948.   H. W. AINSWORTH   2,450,216
ELECTRIC CONTROL CIRCUIT
Filed May 21, 1946
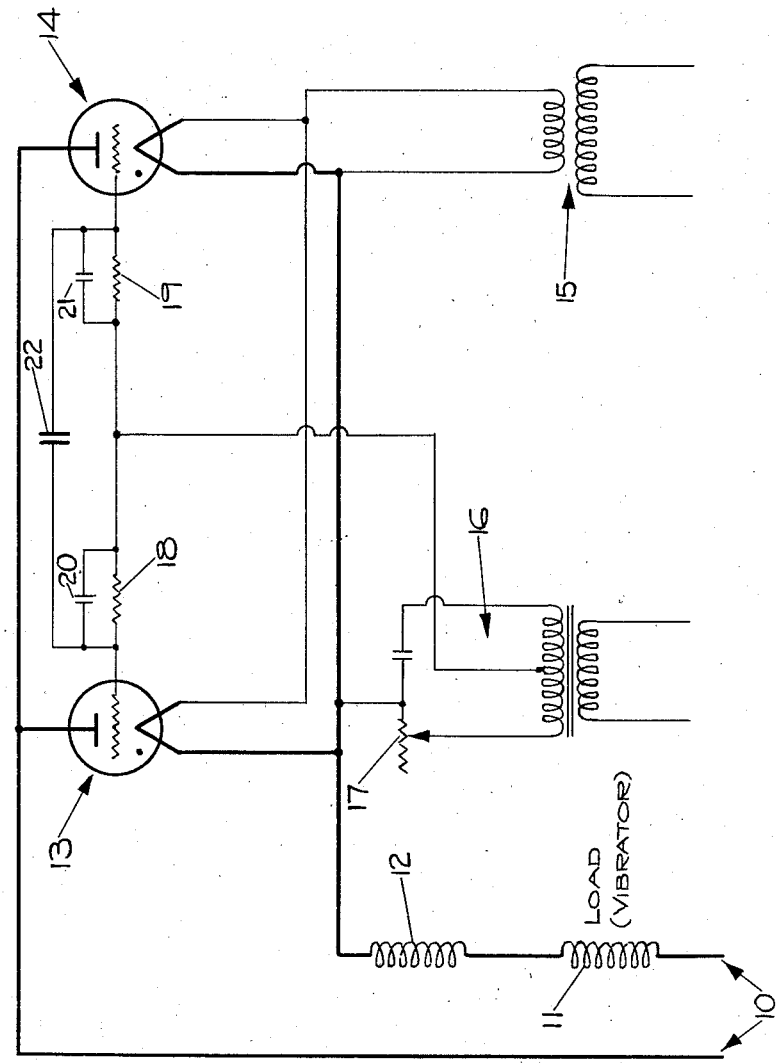
INVENTOR;
HAROLD W. AINSWORTH,
BY
ATT'Y.

Patented Sept. 28, 1948

2,450,216

UNITED STATES PATENT OFFICE 2,450,216

ELECTRIC CONTROL CIRCUIT

Harold W. Ainsworth, Galloway, Ohio, assignor to The Jeffrey Manufacturing Company, a corporation of Ohio Application May 21, 1946, Serial No. 671,152

4 Claims. (Cl. 175—363)

This invention relates to an electric control circuit, and an object of the invention is to provide such a circuit in which a pair of electron discharge tubes, such as gaseous filled rectifier tubes, may be connected in parallel and divide the current load substantially equally between them.

Another object of the invention is to provide a circuit of the above-mentioned type in which the load is equally divided between the parallel tubes by causing them to carry successive or alternate positive half waves of current impulses under the stimulus of an alternating current voltage.

Other objects of the invention will appear hereinafter, the novel features and combinations being set forth in the appended claims.

The accompanying drawing is a wiring diagram of the control circuit of my invention.

Said control circuit includes a source of alternating current of any desired frequency and voltage which, for example, may be 60-cycle current of 110 volts which is delivered to conductors 10. A load 11 is connected in series with one of the conductors 10 and this load in one embodiment of my invention takes the form of a vibratory motor or packer, such as shown in the patent to James A. Flint, No. 2,094,698, entitled Device for packing materials, dated October 5, 1937. I have also shown a choke coil 12 connected in series with the load 11 which is preferably, though not necessarily, employed.

The load 11 is adapted to be energized from pulsating direct current which is supplied from the alternating current energization of the cathode-anode circuits of a pair of electron discharge tubes 13 and 14 which are preferably of the gaseous type. The plates or anodes of said tubes 13 and 14 are both connected together and are connected to one of the conductors 10. The filaments or cathodes of said tubes 13 and 14 are likewise connected together and are connected directly to the other of said conductors 10. The filaments of said tubes 13 and 14 may be heated over an obvious circuit from a transformer 15 which may be energized from any suitable source, such as the source which energizes conductors 10.

The average current delivered to the load 11 and thus its amplitude of vibration, when in the form of the barrel packer of the above identified Flint patent, may be adjusted by a phase shift circuit 16 which is connected to the two grids of the tubes 13 and 14, which tubes are of the grid control type. Adjusting the variable resistor 17 of the phase shift circuit 16 will adjust the phase of the grid voltage relative to the cathode-anode voltage of said tubes 13 and 14 in a manner well understood in the electronic control art. Phase shift circuit 16 may be energized from any desired source, such as that which energizes conductor 10.

The grids of the two tubes 13 and 14 are connected in parallel but each has an individual grid resistor connected in series therewith, the resistor associated with the grid of tube 13 being designated 18 and that associated with the grid of tube 14 being designated 19. A condenser 20 is provided in parallel with resistor 18 and a condenser 21 is provided in parallel with resistor 19.

Connected directly to the grids of said tubes 13 and 14, independently of the resistors 18 and 19 or the condensers 20 and 21, I provide an additional condenser 22, opposite plates of which are connected to said grids of tubes 13 and 14, respectively. It is thus evident that condenser 22 constitutes a capacity reactance interconnecting the grids of tubes 13 and 14.

It has long been desirable to be able to increase the amount of rectified or pulsating current which may be delivered from an alternating current source to a load by connecting two electron discharge tubes, such as gaseous tubes, in parallel. Experience has shown, however, that this is very difficult to do and obtain an equal distribution of the current between the two tubes. For example, if the two tubes are merely connected in parallel it is almost inevitable that one of them will take all or most of the current. As a consequence the rectifier provided does not have twice the rating of a single tube.

Efforts to divide the current equally between the two tubes when they fire simultaneously have not met with particular success and generally they involve expensive auxiliary equipment or auxiliary equipment which interferes with the efficiency of the unit. In the electrical circuit which I have provided I do not attempt to cause the tubes 13 and 14 to conduct simultaneously positive (or negative) half cycles but rather cause them to conduct alternately or successively. Each tube in this manner will pass a greater amount of instantaneous current than if they fired simultaneously, but the rating of the tube is not determined by the instantaneous current passed but rather by the average current. As a consequence, since each tube, when firing, will carry the entire current delivered to the load it is evident that there will be a substantially equal distribution of the load between the two tubes over any appreciable period of time. For example, if a 60-cycle voltage source is connected to the tubes, each tube will fire thirty half cycles each second. During each half cycle of positive (or negative) current flow only one tube will be firing and the instantaneous current will be higher than if both tubes fired simultaneously. This alternate firing of the tubes 13 and 14 therefore insures a substantially equal division of the total load between them.

I have found from experiment that the values of the condensers 20, 21 and 22 are critical, but the values of the resistors 18 and 19 are not particularly critical and once a balanced condition is realized tubes 13 and 14 of quite different characteristics and construction may be substituted without disturbing the balance of the system. The experiments conducted have not afforded a definite theoretical basis upon which the accomplished results can well be explained. As a consequence I shall set forth the values which I have found to be useful to produce the results stated.

The tubes 13 and 14 may be of various sizes and constructions. For example, I have used both 5 amp. tubes and 10 amp. tubes. Said tubes have been of the mercury vapor type as well as xenon filled. The resistors 18 and 19 may have a value from 50,000 to 100,000 ohms, though, as above stated, the tests indicate they may vary even beyond this range.

A successful balance may be obtained by employing condensers 20 and 21 with capacities of .02 microfarad and condenser 22 of a capacity of .1 microfarad. It is believed clear that other values of these condensers may be employed, but the experiments so far conducted have not established any fixed ratio or relation between them.

Without asserting the accuracy of the theory, one possible explanation of the phenomena involved is as follows. Assuming that the tube 13 is conducting through a half cycle the grid thereof may pick up sufficient electrons to charge the condenser 22, one plate of which is connected directly to the grid, the other plate of which is connected to the cathode of tube 13 through the phase shift circuit 16. This charge on condenser 22 may then provide a negative bias on the grid of tube 13 and a positive bias on the grid of tube 14 so that during the next positive half cycle of voltage on plates of tubes 13 and 14 tube 14 will become conducting and tube 13 will be blocked off. The condenser 22 may discharge through resistors 18 and 19 and then become reversely charged because of the electron flow in tube 14.

While, as above stated, the capacity of the condenser 22 is fairly critical and is preferably set at the value given, experiments show that if said capacity is increased above this value the alternate firing of the tubes will be preserved, but there is a tendency for the current flow to be progressively decreased. Possibly this is because of some action on the phase shift mechanism 16 and it may well be that the critical characteristic of the condenser 22 is only that it must be above a certain minimum capacity.

In any event the circuit provided is one of considerable practical value because insofar as is known it makes possible the parallel operation of two gas-filled tubes with substantially equal loading of each of them and without requiring the insertion of any impedance or resistance in the load circuit, thus avoiding the necessity of any waste of energy in said load circuit.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. An electrical circuit including a source of alternating current, a load, a pair of gaseous electron grid controlled discharge tubes connected in parallel to pass half-wave current impulses to said load, means operable to produce substantially equal distribution of the current through said tubes by causing them to be alternately conductive and non-conductive whereby the load is substantially equally divided between them, said means including a condenser connecting the grids of said tubes together, and potential dividing circuit means for the grid circuits of said tubes.

2. An electrical circuit including a source of alternating current, a load, a pair of gaseous electron grid controlled discharge tubes connected in parallel to pass half-wave current impulses to said load, and means operable to produce substantially equal distribution of the current through said tubes by causing them to be alternately conductive and non-conductive whereby the load is substantially equally divided between them, said means including a condenser in the grid circuit of each tube and a condenser having opposite plates connected to said grid circuits connecting the grids of said tubes together.

3. An electrical circuit adapted to deliver variable value pulsating direct current from an alternating current voltage including a pair of gaseous electron discharge tubes having control grids and having their cathodes and anodes respectively connected in parallel, means for adjusting the current flow through said tubes including a phase shift control for the grid circuits thereof, said tubes having separate impedances in said grid circuits, and a relatively large capacity condenser connecting said grids together and having a capacitance which causes said tubes to conduct alternately whereby the average current in said circuit will be substantially equally divided between said tubes.

4. An electrical circuit adapted to deliver variable value pulsating direct current from an alternating current voltage including a pair of gaseous electron discharge tubes having control grids and having their cathodes and anodes respectively connected in parallel, means for adjusting the current flow through said tubes including a phase shift control for the grids thereof, and a condenser in each grid circuit and another condenser having opposite plates thereof connected to separate tube grids and having a characteristic which causes said tubes to conduct alternately whereby the average current in said circuit will be substantially equally divided between said tubes.

HAROLD W. AINSWORTH.

REFERENCES CITED

The following references are of record in the file of this patent:

UNITED STATES PATENTS

| Number | Name | Date |
|---|---|---|
| 2,104,633 | Alexanderson | Jan. 4, 1938 |
| 2,335,675 | Holters et al. | Nov. 30, 1943 |